United States Patent [19]
Perchak

[11] Patent Number: 5,710,647
[45] Date of Patent: Jan. 20, 1998

[54] TARGET FOR LASER LEVELING SYSTEMS

[76] Inventor: Robert M. Perchak, 2354 Wymore Pl., Dayton, Ohio 45459

[21] Appl. No.: 520,852

[22] Filed: Aug. 30, 1995

[51] Int. Cl.$^6$ .............................. G02B 5/32; G01B 11/26; G01C 5/00
[52] U.S. Cl. ........................ 359/15; 356/138; 33/291
[58] Field of Search ........................ 359/15, 17; 356/138, 356/373, 395, 399, 347, 348; 33/292; 219/121.69

[56] References Cited

U.S. PATENT DOCUMENTS

| | | | |
|---|---|---|---|
| 3,836,258 | 9/1974 | Courton et al. | 356/399 |
| 5,471,327 | 11/1995 | Tedesco et al. | 359/15 |
| 5,524,352 | 6/1996 | Rando et al. | 33/291 |
| 5,570,189 | 10/1996 | Salmon | 356/399 |

*Primary Examiner*—Paul M. Dzierzynski
*Assistant Examiner*—Audrey Chang
*Attorney, Agent, or Firm*—Joseph G. Nauman

[57] ABSTRACT

A number of embodiments of targets, for use with scanning light beam leveling/marking devices, are constructed with their elements incorporated as target structure. The lens and beam divider functions are formed into optical quality parts such as a polycarbonate block, these parts thus are made essentially as an integral element, or the function of those elements can be provided by a first hologram which is optically equivalent of the input lens and beam dividing axicon, and the viewing screen diffuser function provided by a second hologram, and these holograms may be made on a single substrate, to improve and maintain alignment. The optical path for the impinging light beam (after it is divided) may be transmitted and reflected from the input to the view window through one or more reflector surfaces, with the body of the target functioning as a waveguide. Utilizing such integral constructions, and using input and output holograms, provides advantages of minimized space for the optical elements, and built-in permanent alignment of these elements. They also are small in size, sturdy, have no external protuberances, and will withstand rough handling in a construction environment.

14 Claims, 2 Drawing Sheets

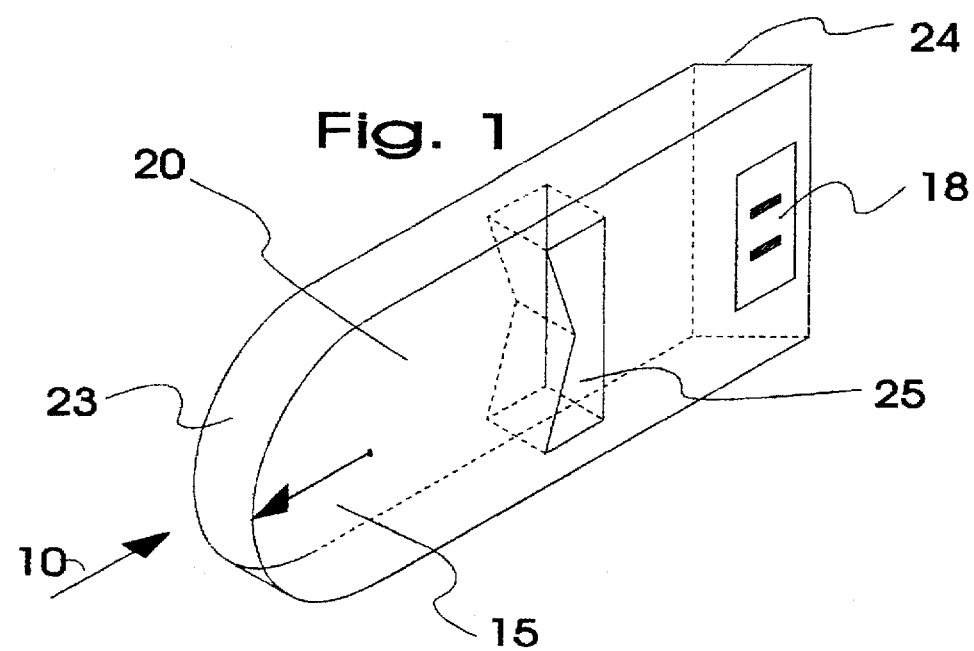
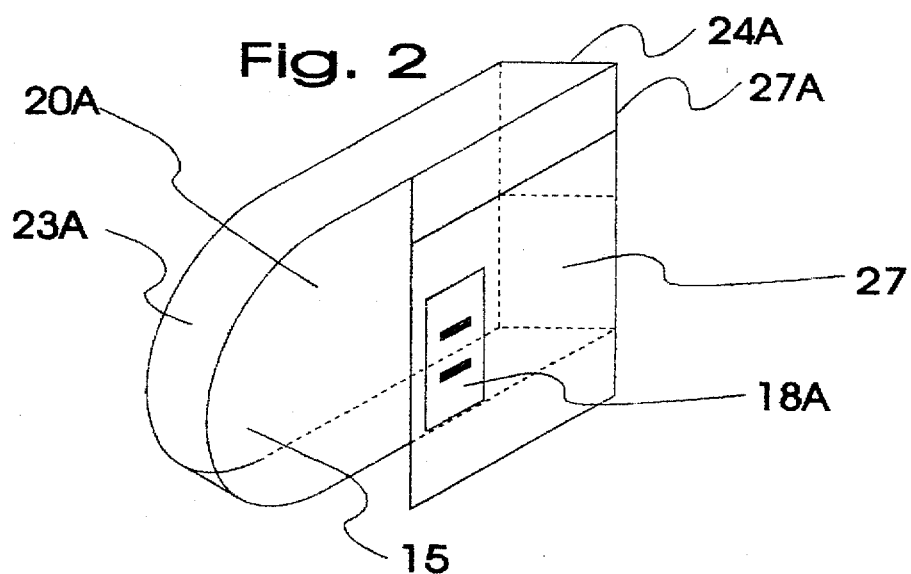
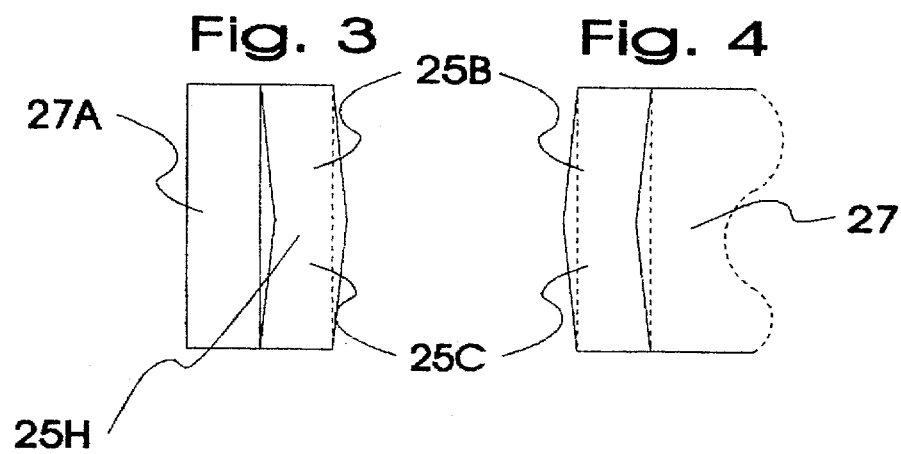

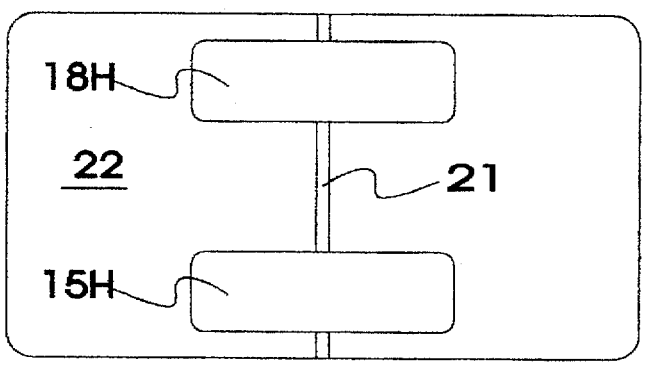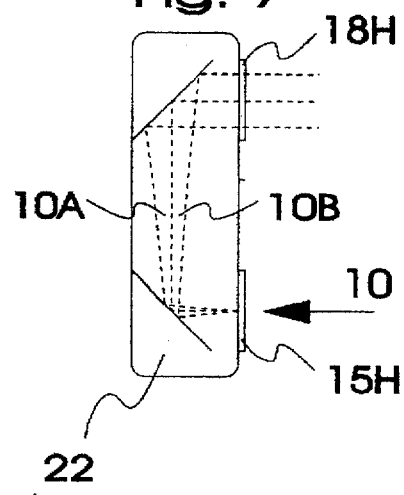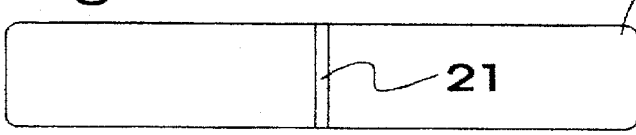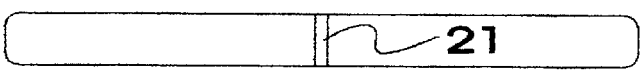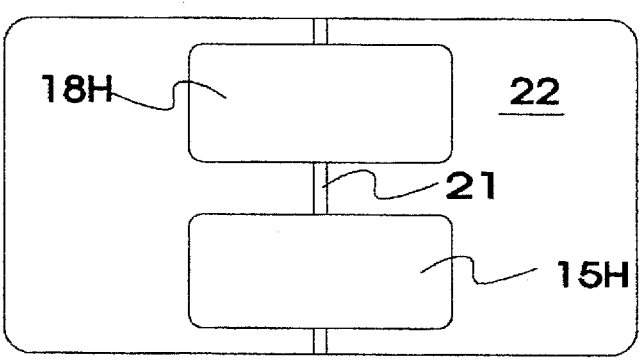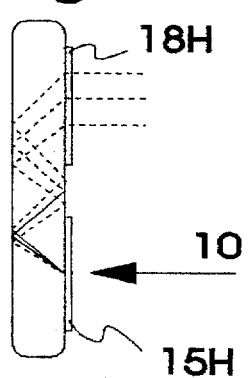

TARGET FOR LASER LEVELING SYSTEMS

RELATED APPLICATION

This application is a related case of U.S. patent application Ser. No. 08/520,853 filed 30 Aug. 1995.

FIELD OF THE INVENTION

This invention relates to target devices for viewing of a scanning light beam, preferably a laser beam, in systems used to develop an accurate level or elevation position.

BACKGROUND OF THE INVENTION

As explained in the parent application, many techniques exist today for viewing scanning laser beams at a distance, as in laser beam leveling systems. A typical system is disclosed in U.S. Pat. No. 4,221,483 issued 9 Sep. 1980. These devices are often portable instruments, and produce a collimated beam of laser light which is directed on a horizontal axis and rotated (scanned), most conveniently in a circle, to produce a trace for making one or more reference level marks about an area, along a wall, etc. The instrument is leveled at its location so the laser beam scans in a truly horizontal plane.

Usually the laser is a HeNe or laserdiode operating around 633 nm. These are used because of cost and availability. A yellow-green laser is sometimes used as these are more suitable to the sensitivity of the human eye.

Various targets are used to assist in referencing the point or points at which the beam impinges the object (e.g. surface) to be marked.

Some of the target techniques are: a) a diffuse reflective scatterer over a broad area, such as a white card, on which views are relatively dim because energy is spread out; b) ground glass or back side aluminized ground glass, which are brighter and less diffuse than white card; c) corner cube reflectors, such as in taillight reflectors for automobiles, which have very bright and very narrow angle of view; d) retroreflective film, similar to the corner cube reflectors; and e) a target, as disclosed in U.S. Pat. No. 5,095,629, which is a molded plastic target with a side for transmission and one side for reflection; this form of target device incorporates a fresnel lens and or group of miniprism facets which serve to direct the light off-axis; by adding a specially designed surface texture to the other side of the target, a particular shape of diffuse pattern can be generated.

The target material can additionally be molded with a dye which excludes all wavelengths except a moderately narrow band around the wavelength of the laser to be viewed.

The aforementioned targets are typically used with a rotating laser beam of less than 2 milliwatts and at a rotational speed of less than 600 rev./min. This power and scanning speed limit results from government regulations intended to protect the eyes of users. The rotating beam provides for the definition of a plane, particular suitable for contracting, architectural, and surveying purposes.

However, at large distances from the laser, the time during which the laser beam sweeps across the target area is very short. For example, a 2 inch (5 mm.) wide target that is 100 feet (30 m.) away from the instrument would be illuminated by the laser beam only about 270 micro-seconds at 60 rev./min. This is less than the integration time of the human retina, and thus causes the beam to appear dimmer to the user.

The projected beam is almost always Gaussian or near Gaussian, which means that the edges of the beam are not clearly defined. Furthermore, as the target is moved farther from the source, the beam spreads and becomes more degraded. Thus, using an "edge" introduces error. If a user tries very carefully to determine the center of the beam, difficulty still arises due to the lack of contrast.

SUMMARY OF THE INVENTION

The present invention is an improvement on the method and apparatus described in the above-identified copending application. This invention also makes use of the fact that the human eye and optical/nervous system is extremely good at splitting a distance in half or finding the center of a circle, etc., and at perceiving differences in brightness. Targets according to the present invention are relatively inexpensive passive devices of minimum size, e.g. 3 inches by 4 inches by ½ inch thick, or even thinner, which can fit in a shirt pocket or the like.

A number of the embodiments of these targets are constructed with their elements incorporated as target structure, rather than as optical elements housed in a case. For example the lens and beam divider functions can be formed into optical quality parts such as a polycarbonate block, or the function of those elements can be provided by a first hologram which is optically equivalent of the input lens and beam dividing axicon, and the viewing screen diffuser function is provided by a second hologram. To improve and maintain alignment, these parts can be made essentially as an integral element, or these holograms may be made on a single substrate mounted to the face of a suitable housing. The optical path for the impinging light beam (after it is divided) may be transmitted and reflected from the input to the view window through one or more reflector surfaces.

In another embodiment the holograms and substrate are mounted to a light transmitting (preferably transparent) rigid backing substrate. The divided image beam is transmitted through the backing substrate, which functions as a wave guide, and ultimately through the diffusing hologram at the viewing window.

Utilizing integral constructions as disclosed, and using input and output holograms, offers advantages of minimized space for the optical elements, and built-in permanent alignment of these elements. They also are sturdy, have no external protuberances, and will withstand rough handling in a construction environment.

BRIEF DESCRIPTION OF THE DRAWINGS

FIG. 1 is a schematic perspective view of one form of a target device according to the invention;

FIG. 2 is a schematic perspective view of another form of a target device according to the invention, in which the optical path is folded to shorten the overall length of the target;

FIGS. 3 and 4 are end views of the tyarget device of FIG. 2;

FIG. 5 is a front view of another form of target device, employing two holograms and two reflective surfaces housed within a hollow casing;

FIG. 6 is a side view of the target shown in FIG. 5;

FIG. 7 is an end view, with elementary optical paths added, of the target shown in FIG. 5;

FIG. 8 is a front view of another form of target device, employing two holograms and three reflective surfaces, also within a hollow casing;

FIG. 9 is a side view of the target shown in FIG. 8; and

FIG. 10 is an end view, with elementary optical paths added, of the target shown in FIG. 8.

DESCRIPTION OF THE PREFERRED EMBODIMENT

Acording to the basic arrangement of the invention, an input scanning light beam 10 is received at an input aperture or window, is divided into two preferrably equal component parts by an axicon. The basic method and apparatus are disclosed and claimed in copending U.S. patent application Ser. No. 08/520,853 filed concurrently with this application.

The embodiment illustrated in FIG. 1 is a suitably formed relatively thin (no greater than 0.25 inch) plate or block 20 of optical quality polycarbonate. One end 23 of the block is formed to a radius R to act as a cylindrical lens 15. Along the longitudinal axis of the block, before the focal point of the lens, is an axicon 25 which is formed by removing material to the desired axicon shape. This makes a convenient change in the index of refraction in this area, due to the air space thus formed, which in turn divides the incoming scanning light beam into at least two component beams or parts which are transmitted on through the block.

At the other end 24 of block 20 is a bevel surface, preferably at 45°, which reflects the divided beams toward the front surface of block 20, where a diffusing viewing screen 18 is fastened. The two images thus appear at screen 18 and are of equal brightness when the target is aligned along the centerline of the incoming scanning beam 10.

FIG. 2 shows another form of the unitary target shown in FIG. 1. Here the cylindrical lens 15 is formed in the same manner at one end 23A of the block body 20A, and the other end 24A is formed at a 45° bevel, and is made of two intersecting sections 25B, 25C arranged to provide an axicon 25A (see also FIGS. 3 and 4). This axicon acts by reflection to divide the incoming beam and to transmit the two beams by reflection into a further bevel reflector 27A which is located at an end of a second block 27. A third beveled reflective surface is located at the opposite end 27B of the second block, and functions to reflect the two beams to a diffuser viewing screen 18A (or equivalent hologram) on the face of second block 27, where the spaced apart images appear.

Referring to FIG. 5, a hologram 15H can be designed to perform the function of a spherical lens or a cylindrical lens, and designed so as to reduce the beam 10 in size in both axes perpendicular to the beam (a positive spherical lens function), or to reduce the beam 10 in one axis perpendicular to the beam (a positive cylindrical lens function). The hologram 15H also can be designed to function as an axicon, dividing the incoming beam into at least two parts 10A and 10B. Hologram 15H is mounted across the receiving or input window of a rectangular housing 22

The divided beams 10A, 10B proceed via two reflecting surfaces 20A, 20B internal of the housing 22, to impinge on a diffusing viewing screen 18H, which is a second hologram having the function of a conventional diffuser. The second hologram 18H may optionally also have a magnifying function to aid in viewing the images with the naked eye, and a function to redirect the image forming beams to a more convenient angle of view.

Thus, the lens and beam dividing functions, at the input window, are provided by first hologram 15H, and the viewing screen function is provided by second hologram 18H. To improve and maintain alignment, these holograms may be made on a single substrate mounted internally to the face of housing 22, extending across the input window and the viewing window. By making the holograms with the emulsion surface at the back of the intended mounting, i.e. internally of the housing, the holograms are thereby protected from abrasion and wear by the substrate on which they are created. The reflecting surfaces 20A, 20B can be front surface mirrors, or can be made by creating appropriate air spaces with oppositely beveled surfaces, within a polycarbonate block or the like mounted within housing 22, or simply shaped as the housing The reflecting surfaces may also be mirror-like surfaces on the interior of housing 22, or on the surfaces of the aforementioned block.

About housing 22 there is a reference marking 21 which may conveniently be a groove in the housing surface. This marking is arranged to bisect the input window and thus can be an indicator of the location of the scanning beam when it is indicated by the target as centerd by appropriately moving housing. Marking 21 thus is an aid to placing appropriate location (level) marks on structure being scanned for creation of a level guide reference.

The substrate with the holograms is mounted to the front of housing 22 and the reflector surfaces 20A, 20B are located (e.g. supported) within the housing to direct the divided incoming beam onto second hologram 18H. It will be appreciated that such a construction is simple and straight forward, and requires a minimum of optical alignment which is maintained after assembly of the parts.

In another embodiment (FIGS. 8–10) the holograms and substrate are mounted to a light transmitting (preferably transparent) rigid backing substrate 30, which may be a form of optical block. The emulsion side of the hologram substrate is adhered to the rigid substrate 30 by suitable optical adhesive. The split image beam is refracted through the backing substrate 30 and ultimately through second hologram 18H at the viewing window.

The determination of the centerline of the incoming light beam 10 is made from observing the ratio of the size and brightness of the two images from beams 10A and 10B, as shown on viewing screen 18H.

A particularly important advantage of this light target is that it allows for readily finding the centerline of a scanning light beam in normal room lighting; filters can be added to the holograms to provide adequate ambient light rejection, as may be necessary. The target is also tolerant of changes in the tilt angle of the target housing with respect to the centerline of the incoming scanning beam. If the mark on the target housing is coincident with the centerline or beam axis, then that mark, and the correct determination of the centerline, will be independent of rotation about that point.

The forms of target disclosed in this application are relatively inexpensive, passive hand held devices which can be dimensioned to fit within a shirt pocket, and are able to function with great accuracy and under considerable variation in ambient lighting.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a scanning system for providing elevation marks at a surface located at a distance from a scanning light beam source by locating the center of the scanning beam as its scans the surface, the improvement comprising a portable target body adapted to be located at the surface, said target body including a lens and an axicon receiving a light beam from said lens and for dividing the light beam impinging on said target into at least two component beam parts, diffuser means providing a viewing screen, and means for directing the divided component beams onto said viewing screen to produce adjacent images visible on said viewing screen for comparison as to visual equality as to size and intensity.

2. A target as defined in claim 1, further including said body having an inlet window for said lens and axicon and a viewing window for said diffuser means, a reference indicator on said body located at a predetermined position with respect to said inlet window, said target body being locatable on the surface and ajustable with respect to the scanning light beam until the images from the divided beams appear equal as the scanning beam is repeatedly passing the center of said lens and said axicon, and the reference indicator can be used to mark the surface.

3. A target as defined in claim 1, wherein the functions of said lens and said axicon are provided by a first holographic divider, and said diffuser means is a holographic diffuser.

4. A target as defined in claim 3, wherein said body is an optical block onto which said holograms are mounted, said block forming a waveguide to transmit the divided light beams from said first hologram to said holographic diffuser.

5. A target as defined in claim 1, wherein said body is an optical block into which said lens and said axicon are formed as integral elements.

6. A target for locating the center of a scanning light beam impinged repeatedly on said target, comprising said target housing having an input aperture and a viewing aperture spaced apart, a beam splitting hologram at said input aperture to divide a beam entering said input aperture into equal component beam parts, a viewing hologram at said viewing aperture receiving the component beam parts in adjacent locations and producing adjacent images thereon, whereby an observer can discern equality and inequalities of the adjacent images as the position of the target is moved to center said input aperture with respect to the input light beam so as to produce equal images from the component beams.

7. A target as defined in claim 6, further including means for directing the component beams onto said viewing screen such that the component beams each produce an enhanced image on said viewing screen in predetermined alignment and visual equal intensity when the incoming light beam is centered with respect to said input aperture.

8. A passive hand held target for locating the center of a scanning light beam impinged repeatedly on said target as the target is held adjacent a surface being scanned, said target comprising a target body to be located at the surface, said target body including a focusing and beam dividing means for receiving the scanning light beam impinging on said target and dividing the input beam into at least two component beam parts, diffuser means on said body providing a viewing screen for the component beam parts, portions of said body providing wave guide means for directing the divided parts of the light beam onto said viewing screen to produce visible adjacent images on said viewing screen for comparison as to visual equality.

9. A target as defined in claim 8, wherein said body is an optical block into which said focusing and beam dividing means are formed as integral lens and said axicon elements.

10. A target as defined in claim 8, said body including an inlet window for said focusing and beam dividing means and a viewing window for said diffuser means, a reference indicator on said target body, said target body being locatable on the surface and adjustable with respect to the scanning light beam until the images from the divided beams appear equal as the scanning beam is repeatedly passing the center of said lens and said axicon, and the reference indicator can be used to mark the surface.

11. A target as defined in claim 8, wherein said focusing and beam dividing means is a first holographic divider, and said diffuser means is a holographic diffuser.

12. A target as defined in claim 11, wherein said body is an optical block onto which said holograms are mounted, said block forming a waveguide to transmit the divided light beams from said first hologram to said second hologram.

13. A target as defined in claim 11, wherein said body is an optical block having a lens formed therein at one end and an axicon formed as a shaped region of different optical index formed in said block to receive an input beam and to divide said beam into component parts, said block transmitting the component beams to the viewing window.

14. A target as defined in claim 8, wherein said body is a first optical block having a lens formed at one end thereof and a reflective axicon formed at the opposite end of said first block, said axicon being capable of directing component beams through an adjacent portion of the face of said first block, a second optical block attached to said first block and having a reflective surface at one end thereof complementing and cooperating with said axicon to transmit the component beams along said second block, a third reflective surface at the other end of said second block and aligned to transmit the component beams to said viewing surface.

* * * * *